Sept. 20, 1966 L. R. HARPER 3,274,569

DECODING DEVICE

Filed June 21, 1961 3 Sheets-Sheet 1

*INVENTOR.*
LEONARD ROY HARPER

*BY* [signature]

ATTORNEY

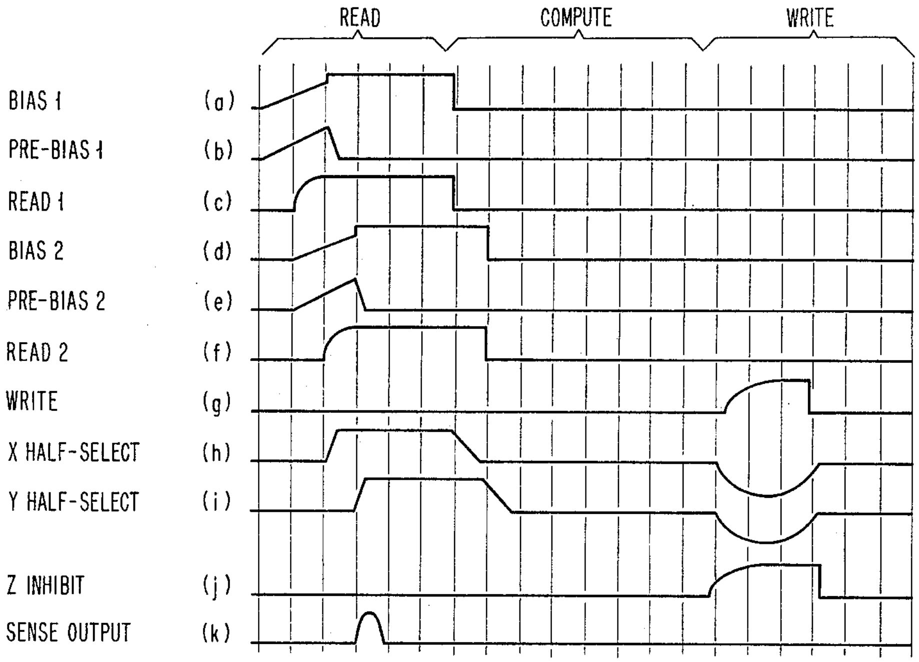
FIG. 2
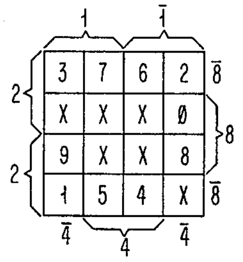
FIG. 4(a)
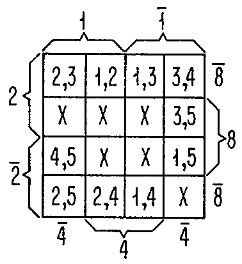
FIG. 4(b)
| BCD | BIAS DRIVERS | |
|---|---|---|
| | ON | OFF |
| 0 | 124 | 35 |
| 1 | 134 | 25 |
| 2 | 125 | 34 |
| 3 | 145 | 23 |
| 4 | 235 | 14 |
| 5 | 135 | 24 |
| 6 | 245 | 13 |
| 7 | 345 | 12 |
| 8 | 234 | 15 |
| 9 | 123 | 45 |
FIG. 4(c)
$\overline{BD1} = \bar{1}\cdot\bar{2} + 2\cdot 4$
$\overline{BD2} = 1\cdot\bar{8}$
$\overline{BD3} = 2\cdot\bar{4} + \bar{1}\cdot 3$
$\overline{BD4} = \bar{1}\cdot\bar{4}\cdot\bar{8} + \bar{2}\cdot 4 + 1\cdot 8$
$\overline{BD5} = 8 + \bar{2}\cdot\bar{4}$
FIG. 4(d)

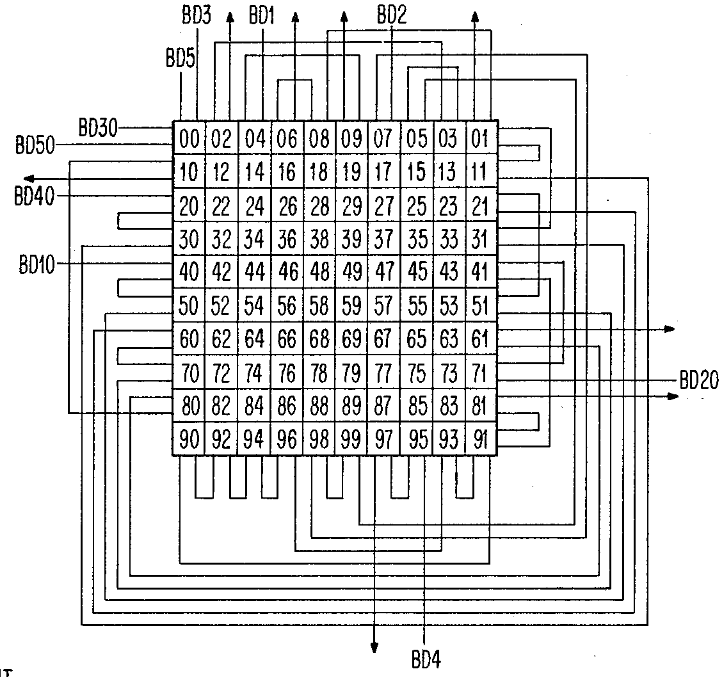
FIG. 5
FIG. 6
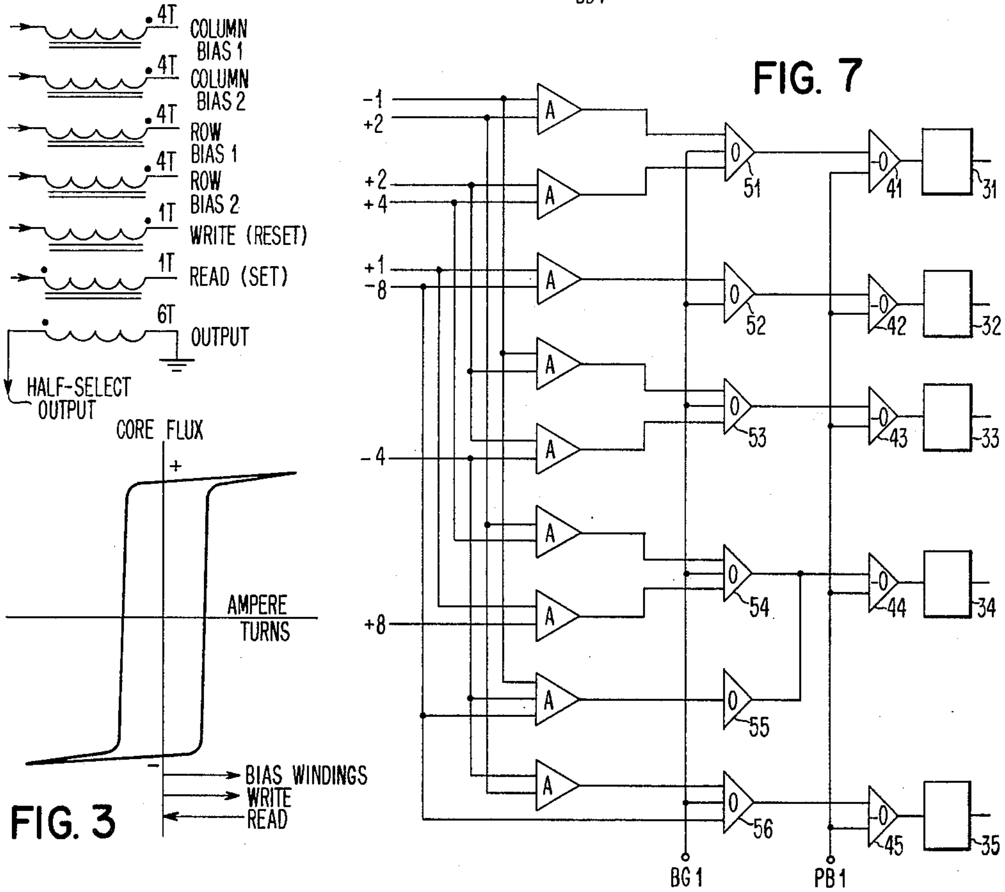
FIG. 6, FIG. 3, FIG. 7

United States Patent Office 3,274,569

Patented Sept. 20, 1966

3,274,569

DECODING DEVICE

Leonard Roy Harper, San Jose, Calif., assignor to International Business Machines Corporation, New York, N.Y., a corporation of New York Filed June 21, 1961, Ser. No. 118,623

11 Claims. (Cl. 340—174)

This invention relates generally to decoding devices and specifically to such devices as used in magnetic core storage systems.

In medium and large size ferrite core storage devices it is customary to develop the half-select currents from the output of switch core matrices. In this manner the number of drivers required to address a large core array can be substantially reduced without deterioration of performance. The switch core matrix uses larger cores than the storage array and develops high current pulses suitable for reading out the larger storage array.

In a conventional switch core matrix, selection of the desired core is accomplished by means of coincident currents applied to drive lines entering the matrix at right angles. While this is a satisfactory approach from the standpoint of the results which may be achieved, it leaves much to be desired from the standpoint of simplicity and economy.

Each drive line must have an accurately regulated one-half-select current applied thereto if optimum performance is to be achieved. If the current drops to a value below this figure, there is a chance that the core will develop an inadequate or distorted output or even fail to develop any output. Since cores and transistor drivers are temperature sensitive devices, it is necessary to include temperature compensation in the driver circuits. This contributes to a higher cost device.

Another disadvantage of the standard coincident current switch core matrix is the large number of drivers required. Commonly, the coincident current array requires as many drivers as the sum of the rows and columns. Since each driver must be regulated as described previously, the cost of the drivers soon becomes an important element in the cost of a memory system.

In this invention the number of drivers is substantially reduced and the need for current regulation is virtually eliminated for all but one driver. These improvements are accomplished by winding the switch core matrix in a novel manner permitting a core to be negatively selected according to a two out of N code. In other words, by deenergizing two of the row windings and two of the column windings the desired core can be selected.

Each core in the matrix has four bias windings wound thereon, two of these are column windings and two are row windings. The bias windings all drive the cores in the same direction. A read winding includes all cores and tends to drive the cores in a direction opposite to that of the bias winding. The current through the bias windings and the read winding is essentially the same. Therefore, the read winding does not change the state of cores which have energized bias windings. However, the four deenergized bias windings coincide on the selected core leaving this core unbiased, The read winding changes the state of this core to produce a signal at the output winding associated with this core.

It is an object of this invention to provide an improved means for addressing a magnetic core storage system.

It is another object to provide an improved decoder for converting an address from a data processing system into half-select currents for a magnetic core storage system.

Still another object is to provide a switch core matrix which may be directly addressed in a two out of N code.

Another object is to provide an improved decoder for a two out of N code.

The foregoing and other objects, features and advantages of the invention will be apparent from the following more particular description of a preferred embodiment of the invention, as illustrated in the accompanying drawings.

In the drawings:

FIG. 2 is a timing diagram showing the processing cycle and the principal memory current wave forms.

FIG. 3 is a hysteresis curve showing the direction and magnitude of the drive currents.

Figure 1:
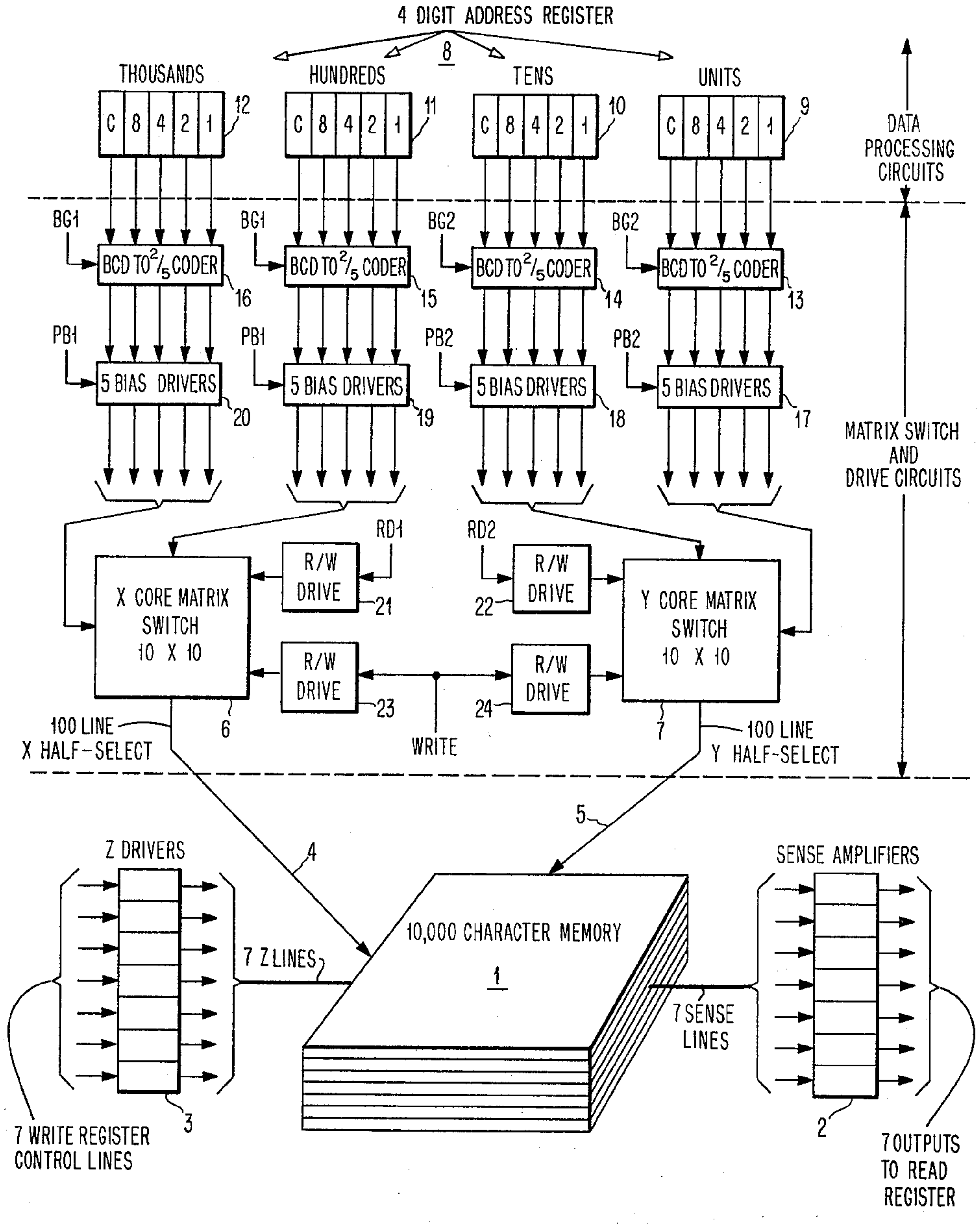
FIG. 1 is a block diagram of a memory system utilizing my invention.

FIGS. 4(*a*) to 4(*d*) is a diagram which illustrates the manner in which the bias drivers are operated according to the address selected.

FIG. 5 is a schematic drawing showing the winding layout of a 100 core matrix switch utilizing my invention.

FIG. 6 is a winding diagram for an individual core of the matrix switch.

FIG. 7 is a logic diagram of the binary coded decimal to two out of five coder.

The 10,000 character memory 1 shown in FIG. 1 is made up of 7 100 x 100 core planes. Each core plane has a sense winding connected to one of sense amplifiers 2. The sense winding provides an output pulse when any core within the plane changes state during a read operation. The output of sense amplifiers 2 leads to a read register or other suitable device for indicating the character read out of memory.

In addition to the sense winding, each core plane in memory 1 contains an inhibit or Z winding which includes all cores within a single plane. The inhibit windings are energized from Z drivers 3 in response to the contents of a write register which may be any suitable device. The function of the Z windings is to block the recording of a binary 1 in memory 1 during the write operation.

Memory 1 is operated according to standard practice with half-select currents applied to X and Y drive lines 4 and 5. The half-select currents coincide in the seven selected cores, one in each core plane, to provide a full select current to the cores which contain the addressed character.

The half-select currents on lines 4 and 5 are in the form of current pulses derived from X and Y core matrix switches 6 and 7 respectively. Each of switches 6 and 7 is made up of a 10 x 10 matrix of switch cores. Each core has an individual output winding to provide the necessary 100 outputs to the X and Y drive lines in memory 1. When a flux change is produced in one of the cores within the matrix, a half-select current is developed in the output winding of that core which provides a half-select current on one of the drive lines in memory 1.

The particular method of addressing core matrix switches 6 and 7 differs from conventional practice and is discussed in greater detail below. It may be assumed that a particular core in matrix switch 7 is selected according to the numbers in the units position 9 and tens position 10 of the 4 digit address register 8. Similarly a particular core in matrix switch 6 is selected according to the numbers in the hundreds position 11 and thousands position 12 of register 8.

Each of the binary coded decimal numbers contained in register 8 is converted into a negative 2 out of 5 code by coders 13, 14, 15 and 16. In other words, for each of the ten possible numbers which must be decoded, two distinctive negative outputs are produced on the five lines emanating from the coder. This results in a different combination of two of each of the 5 bias drivers in the groups 17, 18, 19 and 20 being off for each number contained in positions 9, 10, 11 and 12 of register 8.

For example, assume the register 8 contains the number 7365 corresponding to one address in the memory 1. The tens position 10 and units position 9 are decoded and supplied to bias drivers 17 and 18 to produce an output from Y core matrix switch 7 on one of the lines 5 corresponding to Y position sixty-five. Thus, one of 100 Y positions is selected. In a similar manner the hundreds position 11 and thousands position 12 of register 8 is decoded and supplied to bias drivers 19 and 20 for X core matrix switch 6 to produce an output on one of the lines 4 corresponding to X position seventy-three.

Bias gate timing signals BG1 and BG2 are applied to decoders 15, 16 and 13, 14, respectively. Similarly prebias timing signals PB1 and PB2 are applied to the bias drivers 19, 20 and 17, 18, respectively. While separate timing signals are used to develop the X and Y drive currents for memory 1, this is necessary only where the staggered read technique is applied. If the staggered read approach is not used then BG1 and BG2 could be developed at the same time. Similarly, PB1 and PB2 could also be supplied to bias drivers 17, 18, 19 and 20 at the same time.

The read/write drive 21 for switch 6 is energized by a RD1 signal and read/write drive for switch 7 is energized by a RD2 signal. RD1 and RD2 are staggered or spaced in time for the same reasons as the bias gate and pre-bias signals discussed above.

The reduction in noise provided by the staggered read tecnique is unnecessary during the write operation, which permits a single write signal to energize read/write drivers 23 and 24 associated with switches 6 and 7 respectively.

The means for developing timing signals at spaced intervals does not form part of this invention. Satisfactory means are well known to those skilled in the art so the description herein is limited to an identification of their relative positions in the machine cycle.

Each core within the matrices 6 and 7 contains a plurality of bias windings. Two of these are row bias windings energized from bias drivers 20 in the case of matrix switch 6 and bias drivers 17 in the case of matrix switch 7. Each core contains two column bias windings energized from bias drivers 19 in the case of matrix switch 6, and bias driver 18 in the case of matrix switch 7.

As shown in FIG. 3, the ampere turns of a single bias winding is sufficient to counteract the ampere turns of the read winding, which would otherwise switch the core. Since each core has four such bias windings, when all the bias drivers are on, each core will be supplied with four times the ampere turns necessary to counteract the read ampere turns. The polarity of the bias windings is shown in FIG. 6 which illustrates the additive nature of the bias windings.

FIG. 5 indicated the manner of connecting the individual bias windings. The column bias windings and row bias windings on the individual cores are connected to row and column bias windings on adjacent cores so that each row and each column is defined by two rows and two column bias windings. These individual row and column bias windings are interconnected as shown in FIG. 5 to form bias windings BD1–BD5 for the columns and BD10–BD50 for the rows. Each winding includes four rows or four columns as the case may be. For example, BD1 includes columns 04, 06, 07 and 08 and row bias winding BD10 includes rows 40, 60, 70 and 80.

Selection of a particular core is accomplished by deenergizing the bias windings which define that core. In the case of core 00, bias windings BD3, BD5, BD30 and BD50 would be deenergized leaving core 00 unbiased at positive remanence on FIG. 3. Since column 00 is the only one where BD3 and BD5 coincides the cores of all other columns will have at least one bias winding energized to hold the cores at positive saturation.

Or, putting it another way, by deenergizing two of the BD1–BD5 bias windings and two of the BD10–BD50 bias windings it is possible to unbias a single core within the matrix while leaving all other cores in the biased saturated state.

This relationship follows the rule that the number of combinations of N things taken two at a time is equal to $$C=\frac{N!}{2(N-2)!}$$

where C is the number of combinations and N is the number of bias windings (BD1–BD5 or BD10–BD50).

After the bias windings on the selected core have been deenergized, a read current applied to the read winding tends to drive all cores in a direction opposed to that of the bias windings. Since the 99 unselected cores have from one to four energized bias windings, no change of flux is produced in these cores by the read current and they remain at positive saturation.

The case of the selected core is entirely different since this core has no bias winding energized and is driven toward negative saturation by the read current. The resulting flux change produced in the selected core by the read winding produces a current pulse in the output winding on this core. Since no other core experiences a flux change, no other output windings will develop a signal.

It can be seen that a write pulse output, having a polarity opposite to that of the read pulse, may be conveniently developed from the same core without altering the addressing circuits. This can be done by reversing the current through the read winding, or as shown in the drawings, by energizing a separate write winding which tends to drive all cores in the matrix in the direction of the bias winding.

The relationship between the read winding and the bias winding is used to achieve a faster rise time of the output pulse than would otherwise be possible. In actual operation of the device, all bias windings are energized at the start of every read cycle by means of bias gate, BG, and pre-bias, PB, signals applied to the coders 13–16 and drivers 17–20. After the current through the bias windings has risen to a suitable fraction of the final value the read winding is energized. The delay between turning on the bias drivers and the read drivers allows the more slowly rising bias current to reach a value where it prevents a flux change in the cores due to the read winding. Since there are four bias windings on each core, even the full read current will be inhibited when the bias currents have reached one fourth their final value.

It will be noticed in FIG. 2 that the read currents rise much faster than do the bias currents. This is due to a combination of circumstances. A significant factor in this rapid rise of read current is the coupling between the bias and read windings. The flux change within the cores caused by the bias current induces an aiding current in the read winding and therefore contributes to the fast rise time. Another factor is the relatively lower inductance of the read winding.

After the read winding current has risen to near maximum value, and the bias currents to 60 percent of maximum value, the pre-bias signal is turned off to deenergize those bias drivers connected to the bias windings on the selected core. The current in the deenergized bias windings drops very quickly to a minimum value since there is no transfer of energy into the matrix. The current in the energized bias windings in increased by the collapsing magnetic field of the deenergized bias windings as shown in FIG. 2. It will be recognized that external circuitry imposes no limitation on the rate at which the bias current decreases in the deenergized windings since the energy content of the matrix remains essentially the same.

In summary, the read operation allows all bias currents to reach a point in the region of .6 their final value. Here the total magnetic energy of the partially energized read circuit and the ten bias circuits approximates the magnetic energy within the matrix which exists with six selected bias currents at their final value, four unselected bias drivers completely off and the read current at the final value. At this point the unselected bias drivers are turned off by terminating the PB signals to the drivers. The coupled magnetic energy of the off going bias currents drives the selected on going bias currents very rapidly to their final value. The read current produces a current pulse from the output winding on the selected core by transformer action. The rise time of the current pulse is approximately equal to the fall time of the off going bias currents.

Ideally, the total magnetic energy of the four off-going bias circuits is completely absorbed by the other six bias circuits. As no change in total magnetic energy is required, instantaneous switching of the bias currents is possible. However, leakage flux, drive-transistor decay time, and a slight variation in turn-off delay among the bias drivers prevent ideal switching and limited the output current-rise time to between 0.2 and 0.3 microsecond in one embodiment.

As a practical matter, the optimum time at which PB1 terminates with the least magnetic energy change is determined experimentally by varying the turn off in PB1 until a minimum output-current rise time occurs. Optimum memory-sense output signals result when the rise time of the Y half-select pulse, staggered 1.0 microsecond after the similar X half-select pulse, is approximately 0.25 microsecond. This rise time is impossible to achieve with the low driver voltage employed, if the read pulse goes on after pre-bias turns off. With such timing, the half-select rise times determined experimentally are 0.8 microsecond, approximately three to four times the rise time achieved by the method of timing described.

To produce a minimum noise while maintaining a favorable output signal, the drive current supplied to the X and Y select lines in the memory 1 are staggered. Therefore, there is a slight time difference between the derivation of output pulses from core matrix switch 6 and core matrix switch 7. This is illustrated in FIG. 2 by the difference in application of the bias 1 and bias 2 and read 1 and read 2 currents. It can be seen that the sense winding output from memory 1 which is curve K, is produced upon the application of the Y half-select current to memory 1.

A period of time follows during which the data processing circuits are free to perform computations. At the conclusion of this computation period, a write cycle is initiated and current is supplied to the write winding in matrix switches 6 and 7. As previously described, this write current operates to drive the selected core to the previous state of saturation producing an output pulse opposite in polarity to that produced during read. Since the shape of the write pulse is much less critical, this pulse is produced directly from the application of the write current to the write winding. The desired character is placed in memory at the same location from which the character was read out by applying a Z inhibit current to inhibit windings in memory 1 which block the storing of a 1 in the appropriate plane. In this manner, the planes in which it is desired to record a 0 have the Z inhibit current applied and in those in which it is desired to record a 1, the Z inhibit current is not applied. Thus, the selected core in each case is either changed or not changed as the data processing circuits may require.

The logical arrangement of the binary coded decimal to 2/5 coder is shown in FIG. 7. One such coder is supplied for each of the units, tens, hundreds, and thousands position in the four digit address register 8. Since such registers are conventionally made up of a plurality of triggers, one for each bit position in the register, two outputs are available from each bit position. One output will be considered a positive output and the other a negative one for the purpose of explanation. The various positive and negative outputs from the register are connected to a plurality of logical elements as shown in FIG. 7. While this particular coder utilizes NOR logic, it is entirely possible that a coder duplicating the logical function of the example might be constructed in a slightly different form using another type of logic. Similarly, it is possible to construct a different coder from NOR logic.

Where a logic block contains an A, it indicates that when both inputs are positive, the output is negative. An O in the logic element indicates that when one or more of the inputs are negative, the output is positive. These two functions are both equivalent to the NOR function. The −0 in logic elements 41, 42, 43, 44, and 45 indicates that any negative input results in a negative output. Bias drivers 31, 32, 33, 34, and 35 are turned on by a negative signal from the output of logic blocks 41, 42, 43, 44 and 45 which feed them. In the absence of such a negative signal, the driver is off. All outputs from logic blocks 51, 52, 53, 54, 55 and 56 are positive when the bias gate input BG1 is at a negative level. The BG1 signal therefore gates the logical functions. The negative going PB1 signal will turn on all drivers, irrespective of the logical inputs or the condition of the BG1 signal. The bias gate signal is changed from a negative to a positive level at the time the read cycle is initiated. At the same time, the pre-bias signal changes from a positive to a negative signal so that the output of the logical elements 41–45 feeding the drivers will be negative to turn on all drivers.

A more complete explanation of NOR logic blocks is to be found in "The Application of Transistors to Computers," by R. A. Henle and J. L. Walsh, Proc. IRE, vol 46, pp. 1240–1254, June, 1958.

The logical design of the four coders used to convert the memory address from binary coded decimal form to a 2/5 code is further explained in FIGS. 4*a, b, c*, and *d*. FIG. 4*a* is a Vietch diagram or Karnaugh map of the BCD code in which $\bar{1}\cdot 2\cdot \bar{4}\cdot 8$ equals a decimal zero. Unused redundant combinations are indicated by the conventional X's. As shown in FIG. 4*a*, each bias driver must be on for six of the ten BCD combinations. Conversely, each bias driver must be off for four of the ten BCD combinations.

Off functions $\overline{BD1}$–$\overline{BD5}$ for the five bias drivers are the simplest to derive. Since it is the off function of the driver which determines the core selected it is necessary to develop a coder which provides a positive output to turn the drivers off The matrix switch core windings and their interconnections require that a unique combination of three drivers must be on for each binary coded decimal digit, and similarly, a unique combination of two drivers must be off for each such digit.

As shown in FIG. 4*b* the coder is designed by superimposing the Vietch diagrams of five output functions onto a single map. Bias driver off functions $\overline{BD1}$–$\overline{BD5}$ are designated by the digits 1–5 which are not to be confused by the BCD notation or the decimal notation existing in FIG. 4*a*. Mapping is simply a trial and error process. It involves arranging for the greatest symmetry and tempering the mapping to suit the logic circuits which are to be used. Since the NOR logic blocks used in the embodiment described has a maximum of three inputs, the circuit was designed to meet this limitation. Each of the five digits 1–5 must superimpose once and only once on each of the other four in FIG. 4*b*. Only two digits can exist in each square of the diagram FIG. 4*b*. Truth tables for the on and off functions of each driver are given in FIG. 4*c* and the Boolean expressions describing the off functions which determine the core selected are listed in FIG. 4*d*.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a magnetic core matrix having a plurality of bistable cores arranged according to rows and columns, means for changing the magnetic remanent state of a selected core comprising: bias means for driving all but a selected core to saturation in a first direction, said bias means including row and column bias windings, means for energizing selected of said column bias windings to bias all but one column of said cores to saturation in a first direction, means for energizing selected of said row bias windings to bias all but one row of said cores to saturation in a first direction, a read winding including all of said cores, and means for energizing said read winding to drive an unbiased core to saturation in a second direction whereby the selected core common to said unbiased column and row is changed in state.

2. In a magnetic core matrix having a plurality of bistable cores arranged according to rows and columns, individual output windings inductively associated with each of said cores, and means for changing the magnetic remanent state of a selected core to produce a current in its associated output winding comprising: bias means for driving all but a selected core to saturation in a first direction, said bias means including row and column bias windings, means for energizing selected of said column bias windings to bias all but one column of said cores to saturation in a first direction, means for energizing selected of said row bias windings to bias all but one row of said cores to saturation in a first direction, a read winding including all of said cores, and means for energizing said read winding to drive an unbiased core to saturation in a second direction whereby the selected core common to said unbiased column and row is changed in state to produce a signal in the output winding associated therewith.

3. In a magnetic core matrix having a plurality of bistable cores arranged according to rows and columns, means for changing the magnetic remanent state of a core selected according to a value represented by first and second manifestations in a two out of N code comprising: bias means for driving all but a selected core to saturation in a first direction, said bias means including row and column bias windings, means for energizing selected of said column bias windings according to said first manifestation to bias all but one column of said cores to saturation in a first direction, means for energizing selected of said row bias windings according to said second manifestation to bias all but one row of said cores to saturation in a first direction, a read winding including all of said cores, and means for energizing said read winding to drive an unbiased core to saturation in a second direction whereby the core common to said unbiased column and row is changed in state.

4. In a magnetic core matrix having a plurality of bistable cores arranged according to rows and columns, means for changing the magnetic remanent state of a core selected according to a value represented by first and second manifestations in a two out of N code comprising: bias means for driving all but a selected core to saturation in a first direction, said bias means including a plurality of row and column windings on each of said cores, means connecting said windings to provide a plurality of row and column bias windings with each winding including a plurality of rows or columns respectively, means for energizing selected of said column bias windings according to said first manifestation to bias all but one column of said cores to saturation in a first direction, means for energizing selected of said row bias windings according to said second manifestation to bias all but one row of said cores to saturation in a first direction, a read winding including all of said cores, and means for energizing said read winding to drive an unbiased core to saturation in a second direction whereby the core common to said unbiased column and row is changed in state.

5. Means for decoding a value represented by first and second manifestations in a two out of N code comprising: a plurality of biastable magnetic cores arranged according to rows and columns, a plurality of row and column windings on each of said cores, means connecting said column windings into a plurality of column bias windings less than the number of columns to define each of said columns of cores according to a unique combination of two deenergized of said column bias windings, means connecting said row windings into a plurality of row bias windings less than the number of rows to define each of said rows of cores according to a unique combination of two deenergized of said row bias windings, means for energizing said row and column bias windings according to said first and second manifestations with two each of said row and column bias windings being deenergized according to said manifestations and the remaining of said bias windings being energized, means for supplying to each of said energized bias windings a current sufficient to drive all the cores included thereby to a first state of saturation, a read winding including all of said cores, and means for energizing said read winding to drive the unbiased of said cores to a second opposite state of saturation.

6. Means for decoding a value represented by first and second manifestations in a two out of N code comprising: a plurality of bistable magnetic cores arranged according to rows and columns, individual output windings inductively associated with each of said cores, a plurality of row and column windings on each of said cores, means connecting said column windings into a plurality of column bias windings less than the number of columns to define each of said columns of cores according to a unique combination of two deenergized of said column bias windings, means connecting said row windings into a plurality of row bias windings less than the number of rows to define each of said rows of cores according to a unique combination of two deenergized of said row bias windings, means for energizing said row and column bias windings according to said first and second manifestations with two each of said row and column bias windings being deenergized according to said manifestations and the remaining of said bias windings being energized, means for supplying to each of said energized bias windings a current sufficient to drive all the cores included thereby to a first state of saturation, a read winding including all of said cores, and means for energizing said read winding to produce a flux change in the unbiased of said cores to induce a current in the output winding associated therewith.

7. Means for decoding a value represented by first and second manifestations in a two out of N code comprising: a plurality of bistable magnetic cores arranged according to rows and columns, a plurality of row and column windings on each of said cores, means connecting said column windings into a plurality of column bias windings less than the number of columns to define each of said columns of cores according to a unique combination of two deenergized of said column bias windings, means connecting said row windings into a plurality of row bias windings less than the number of rows to define each of said rows of cores according to a unique combination of two deenergized of said row bias windings, means for energizing selected of said rows and column bias windings according to said first and second manifestations with two each of said row and column bias windings being deenergized according to said manifestations and the remaining of said bias windings being energized to produce an additive M.M.F in those of said cores included by said energized windings, means for supplying to each of said energized bias windings a current sufficient to drive all the cores included thereby to a first state of saturation, a read winding all of said cores, and means for energizing said read winding to drive the unbiased of said cores to a second opposite state of saturation.

8. Means for producing an output signal representative of a function of first and second manifestations in a two out of N code comprising: a plurality of bistable magnetic cores arranged according to rows and columns, individual output windings inductively associated with each of said cores, a plurality of row and column windings on each of said cores, means connecting said column windings into a plurality of column bias windings less than the number of columns to define each of said columns of cores according to a unique combination of two deenergized of said column bias windings, means connecting said row windings into a plurality of row bias windings less than the number of rows to define each of said rows of cores according to a unique combination of two deenergized of said row bias windings, means for energizing selected of said row and column bias windings according to said first and second manifestations with two each of said row and column bias windings being deenergized according to said manifestations and the remaining of said bias windings being energized to produce an additive M.M.F. in those of said cores included by said energized windings, means for supplying to each of said energized bias windings a current sufficient to drive all the cores included thereby to a first state of saturation, a read winding including all of said cores, and means for energizing said read winding to produce a flux change in the unbiased of said cores to induce a current in the output winding associated therewith through transformer action.

9. In a magnetic core matrix having a plurality of bistable cores arranged according to rows and columns, means for changing the magnetic remanent state of a selected core comprising: Y bias windings for rows and X bias windings for columns where X and Y are defined according to $$C=\frac{N!}{2(N-2)!}$$

with C equal to the number of columns or rows and N equal to X or Y according to the value of C, means for selectively energizing all but two of said Y bias windings to produce an additive M.M.F. to drive said cores included by said energized windings to a first saturated state, means for selectively energizing all but two of said X bias windings to produce additive M.M.F. to drive said cores included by said energized windings to a first saturated state, a read winding on each of said cores, and means for energizing said read windings to produce an M.M.F. sufficient to drive an unbiased of said cores to a second saturated state whereby the M.M.F. induced in said selected core by said read winding is effective to reverse the state of the selected core.

10. In a magnetic core matrix having a plurality of bistable cores arranged according to rows and columns, individual output windings inductively associated with each of said cores, and means for changing the magnetic remanent state of a selected core to produce a current in the output winding associated therewith comprising: Y bias windings for rows and X bias windings for columns where X and Y are defined according to $$C=\frac{N!}{2(N-2)!}$$

with C equal to the number of columns or rows and N equal to X or Y according to the value of C, means for selectively energizing all but two of said Y bias windings to produce an additive M.M.F. to drive said cores included by said energized windings to a first saturated state, means for selectively energizing all but two of said X bias windings to produce additive M.M.F. to drive said cores included by said energized windings to a first saturated state, a read winding on each of said cores, and means for energizing said read windings to produce an M.M.F. sufficient to drive an unbiased of said cores to a second saturated state whereby the M.M.F. induced in said selected core by said read winding is effective to reverse the state of the selected core and induce a current in the output winding associated therewith.

11. In a magnetic core matrix having a plurality of bistable cores arranged according to rows and columns, means for changing the magnetic remanent state of a selected core comprising: Y bias windings for rows and X bias windings for columns where X and Y are defined according to $$C=\frac{N!}{2(N-2)!}$$

with C equal to the number of columns or rows and N equal to X or Y according to the value of C, means for energizing said Y bias windings except those on said selected core to produce an additive M.M.F. to drive the unselected of said cores included by said energized windings to a first saturated state, means for energizing said X bias windings except those on said selected core to produce additive M.M.F. to drive the unselected of said cores included by said energized windings to a first saturated state, a read winding on each of said cores, and means for energizing said read windings to produce an M.M.F. sufficient to drive an unbiased of said cores to a second saturated state whereby the M.M.F. induced in said selected core by said read winding is effective to reverse the state of the selected core.

References Cited by the Examiner

UNITED STATES PATENTS 3,072,892 1/1963 Kluck ------------- 340—174

BERNARD KONICK, *Primary Examiner.*

IRVING SRAGOW, *Examiner.*

J. P. SCHERLACHER, J. W. MOFFITT, *Assistant Examiners.*